(12) United States Patent
Courcier (10) Patent No.: US 10,514,143 B2
(45) Date of Patent: Dec. 24, 2019

(54) LIGHT MODULE COMPRISING A PRIMARY OPTICAL ELEMENT EQUIPPED WITH TWO FORMING LAYERS

(71) Applicant: VALEO VISION, Bobigny (FR)

(72) Inventor: Marine Courcier, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/260,237

(22) Filed: Jan. 29, 2019

(65) Prior Publication Data

US 2019/0234572 A1   Aug. 1, 2019

(30) Foreign Application Priority Data

Jan. 29, 2018   (FR) ...................... 18 50670

(51) Int. Cl.
*B60Q 1/00* (2006.01)
*F21S 41/25* (2018.01)
*G03B 21/14* (2006.01)
*G02B 27/09* (2006.01)
*G03B 21/20* (2006.01)

(52) U.S. Cl.
CPC .......... *F21S 41/25* (2018.01); *G02B 27/0955* (2013.01); *G03B 21/142* (2013.01); *G03B 21/206* (2013.01)

(58) Field of Classification Search
CPC ..... F21S 41/25; G03B 21/147; G03B 21/206; G02B 27/0955
USPC ........................................................ 362/538
See application file for complete search history.

(56) References Cited

U.S. PATENT DOCUMENTS

| 8,070,337 B2 * | 12/2011 | Ajiki .................... F21S 48/1154 |
| | | 362/511 |
| 10,260,697 B2 * | 4/2019 | Yamamoto ............ F21S 41/338 |
| 10,288,255 B2 * | 5/2019 | Tsai ........................ F21V 5/007 |
| 2006/0087861 A1 | 4/2006 | Tessnow et al. |
| 2015/0070926 A1 | 3/2015 | Stefanov et al. |
| 2017/0089536 A1 | 3/2017 | Courcier et al. |

FOREIGN PATENT DOCUMENTS

| EP | 2 846 077 A2 | 3/2015 |
| EP | 3 147 557 A1 | 3/2017 |

OTHER PUBLICATIONS

French Preliminary Search Report dated Sep. 18, 2018 in French Application 18 50670 filed on Jan. 29, 2018 (with English Translation of Categories of Cited Documents).

* cited by examiner

*Primary Examiner* — Ali Alavi
(74) *Attorney, Agent, or Firm* — Oblon, McClelland, Maier & Neustadt, L.L.P.

(57) ABSTRACT

A light module of a motor vehicle including: a first transverse row of light sources; a first one-piece primary optical element which has a first forming layer; a bifocal imaging device which is designed to project an image of each light source; characterized in that the light module includes a second transverse row of light sources, the first primary optical element including a second one-piece forming layer which is associated with the second row.

20 Claims, 7 Drawing Sheets

LIGHT MODULE COMPRISING A PRIMARY OPTICAL ELEMENT EQUIPPED WITH TWO FORMING LAYERS

TECHNICAL FIELD OF THE INVENTION

The invention relates to a light module for a motor vehicle which is capable of projecting a light beam with contiguous segments.

TECHNICAL BACKGROUND OF THE INVENTION

A motor vehicle is equipped with headlights intended to produce a light beam which lights the road in front of the vehicle, particularly at night or in cases of reduced brightness.

These headlights can generally be used according to two lighting modes: a first, "high beam" mode and a second, "low beam" mode.

The "high beam" mode makes it possible to produce a long range light beam, which strongly lights the road far in front of the vehicle.

The "low beam" mode provides a lighting of the road that is of more limited range, but that nevertheless offers a good visibility. The more limited range makes it possible not to dazzle the other users of the road.

These two lighting modes are complementary. The driver of the vehicle must manually change mode according to the circumstances, at the risk of inadvertently dazzling another road user. In practice, the act of manually changing lighting mode can lack reliability and sometimes prove hazardous.

Furthermore, the low beam mode provides a visibility that is sometimes unsatisfactory for the driver of the vehicle.

To improve the situation, headlights provided with an ADB (Adaptive Driving Beam) adaptive lighting function have been proposed. Such an ADB function is intended to automatically detect a user of the road likely to be dazzled by a lighting beam emitted in high beam mode by a headlight, and to modify the outline of this lighting beam so as to create a shadow zone at the point where the detected user is located.

The advantages of the ADB function are manifold: ease of use, better visibility compared to lighting in low beam mode, better reliability for the change of mode, risk of dazzling greatly reduced, safer driving.

One known lighting system for a motor vehicle headlight provided with an ADB function comprises a primary optical module. The primary optical module comprises a plurality of light sources, for example light-emitting diodes, associated with three respective light guides. A secondary projection optical element, for example a lens, is associated with the primary optical module.

The light emitted by each light-emitting diode penetrates into the associated light guide and is emitted by an output end of the guide, of rectangular form. The associated secondary optical element projects an image of the output face of each light guide to form, in front of the vehicle, vertical light segments. The light segments produced are partially superposed in the transverse direction. The light-emitting diodes can be switched on independently of one another, selectively, to obtain the desired lighting.

Such a lighting system does however present certain drawbacks.

One such primary optical module, comprising a plurality of independent light guides each associated with a light source is very complex and costly to produce.

Furthermore, the choice of material for producing the optical elements of such a lighting system is particularly limited. Thus, it is not possible to use glass. The optical elements can be produced by injection moulding of polycarbonate, but the injection conditions must be observed precisely, which leads to production difficulties.

Furthermore, the segmented light beam comprises a single row of segments which extend over all the height of the segmented light beam. Because of this, when one segment is off, the road is dark over a more vertically extended zone than is necessary to avoid dazzling a user of the road.

Moreover, for visual comfort reasons and for regulatory reasons, it is preferable for two adjacent segments to be contiguous for the global light beam to light the road uniformly.

Now, the known solutions do not make it possible to obtain contiguous light segments simply, particularly when the light sources are too spaced apart from one another. To obtain a uniform lighting, it is for example necessary to employ complex primary optics.

BRIEF SUMMARY OF THE INVENTION

The invention proposes a light module of a motor vehicle comprising:
  at least one first transverse row of light sources;
  at least one first one-piece primary optical element which has at least one first forming layer which comprises a transverse rear light input face common to all the light sources of the first row, an upper face and a lower face for guiding the light by total internal reflection towards a transverse front output face;
  at least one bifocal imaging device which is designed to project an image of each light source, the imaging device having a first, transverse focusing plane which is arranged substantially in proximity to the light sources and a second, vertical focusing plane which is arranged substantially coinciding with the output face of the first forming layer;
  noteworthy in that the light module comprises at least one second transverse row of light sources which is offset vertically relative to the first row, the first primary optical element comprising at least one second one-piece forming layer which is associated with said second row and which comprises a transverse rear light input face, common to all the light sources of the second row, and arranged in the first, transverse focusing plane, an upper face and a lower face for guiding the light by total internal reflection towards a transverse front output face which is arranged in the second, vertical focusing plane.

The light module produced according to the teachings of the invention thus makes it possible to produce a light beam having two independent rows of light segments. Such a primary optical element is easier to produce and its injection mould is less costly to produce.

According to another feature of the invention, the output face of the first forming layer and the output face of the second forming layer are contiguous by one of their transverse edges, apart from the thickness of the plate separating the two forming layers in the injection mould.

This makes it possible in particular to obtain two rows of light segments which are vertically contiguous, even when the light sources of two rows are separated vertically by a distance greater than 10% of the height of the emission surface of one of the light sources.

The light module according to the invention can comprise at least three rows of light sources, the primary optical element comprising at least three transverse forming layers each associated with a row of light sources.

Advantageously, each row comprises at least three light sources.

According to a first embodiment of the invention, each row of light sources comprises at least one group of light sources in which two adjacent light sources are separated by a determined distance, the determined distance being less than 10% of the transverse width of the light emission surface of one of the light sources. In this case, the light segments produced will naturally be transversely contiguous on one and the same row.

According to a second embodiment of the invention, each row of light sources comprises at least one group of light sources in which two adjacent light sources are separated by a determined distance, the determined distance being greater than 10% of the transverse width of the light emission surface of one of the light sources, notably greater than the transverse width of the emission surface of one of the light sources.

The imaging device then comprises means for transversely widening the size of the image of each light source so that the images of two adjacent light sources of one and the same group of one and the same row are contiguous.

For example, the imaging device comprises a secondary optical element which comprises a light passage surface comprising patterns deflecting the light rays to transversely widen the size of the image of each light source.

As a variant, the input face of the forming layer associated with said row of separated light sources comprises relief patterns for transversely widening the size of the image of each light source so that the images of two adjacent light sources of one and the same group of one and the same row are contiguous.

It may be advantageous to arrange a convergent lens interposed between each light source and the input face of the associated forming layer. This makes it possible to make the lighting uniform in the plane of the patterns. Thus, the lighting obtained by the light beam is also more uniform while conserving a good discrimination of the light segments. In fact, the convergent lens makes it possible to avoid having light rays originating from an adjacent light source lighting neighbouring patterns which are not associated with said adjacent light source.

According to a third embodiment of the invention, each row of light sources associated with the first optical element is split at least into two groups of light sources, each group being separated transversely from an adjacent group by a determined distance greater than the transverse width of an emission surface of one of the light sources so that the groups of images of two adjacent groups of light sources produced by the first imaging device are spaced apart by a determined dark interval.

The light module advantageously comprises a second primary optical element having the same characteristics as the first primary optical module, the second primary optical element being associated with at least two rows of light sources in which the light sources are aligned in at least one group, a second bifocal imaging device being associated with the second primary optical element to project a group of images of the associated light sources in the dark interval reserved between two groups of images projected by the first imaging device. This makes it possible to obtain a light beam with contiguous segments connected by the superpositioning of the segments projected by the two imaging devices.

Advantageously, the first primary optical element and the second primary optical element are produced in a single piece. This makes it possible to limit the number of parts to be mounted. This also makes it possible to avoid having to set the positioning of one primary optical element relative to the other.

Each imaging device comprises at least one secondary optical element, the secondary optical elements of each of the imaging devices being advantageously produced in a single common piece. This makes it possible to limit the number of parts to be mounted. This also makes it possible to avoid having to set the positioning of one secondary optical element relative to the other. Furthermore, this makes it possible to arrange all the light sources on a common printed circuit board.

Generally, each imaging device can be formed by the combination of the form of a light output face of the primary optical element and by an associated projection lens.

BRIEF DESCRIPTION OF THE FIGURES

Other features and advantages of the invention will become apparent when reading the following detailed description, for an understanding of which reference will be made to the attached drawings in which.

DETAILED DESCRIPTION OF THE FIGURES

Hereinafter in the description, orientations that are longitudinal, directed from back to front, vertical, directed from bottom to top and transverse, directed from left to right will be adopted in a nonlimiting manner and as indicated by the "L,V,T" trihedron of the figures.

The vertical orientation "V" is used as geometrical reference without relation to the direction of gravity.

Hereinafter in the description, elements that have an identical structure or similar functions will be designated by one and the same reference.

Figure 1:
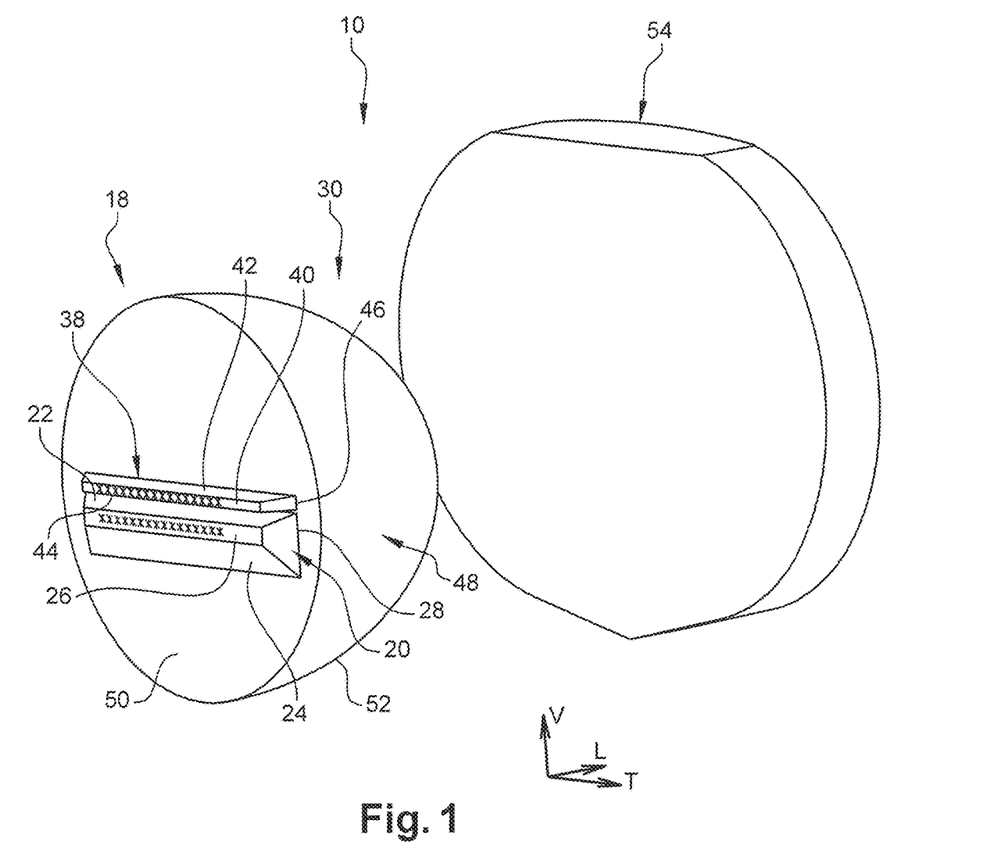
FIG. 1 is a perspective view which represents a primary optical element and a secondary optical element of a first light module produced according to a first embodiment of the invention.

FIG. 1 shows a light module 10 which is intended to equip a lighting or signalling device for a motor vehicle. The light module 10 is intended to emit a final light beam longitudinally towards the front of the vehicle. Here it is an adaptive light beam which is composed of a plurality of contiguous elementary beams. Such a light module 10 is particularly capable of fulfilling an adaptive high beam function, also known as "ADB", for "Adaptive Driving Beam", or it is also capable of fulfilling a directional lighting beam function, also known as "DBL" for "Dynamic Bending Light". Each elementary light beam lights a portion hereinafter called "light segment".

In a variant of the invention that is not represented, the lighting device also comprises a second low beam module which is capable of emitting a single low beam with cut-off.

Figure 2:
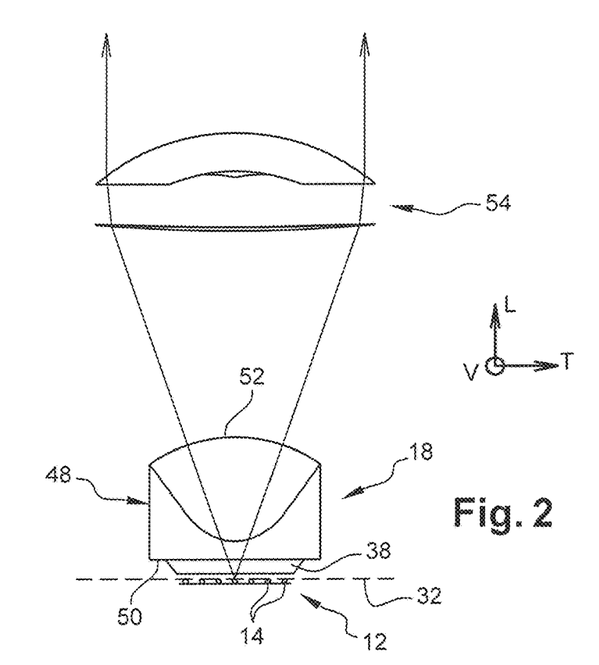
FIG. 2 is a plan view which represents the light module of FIG. 1.
Figure 3:
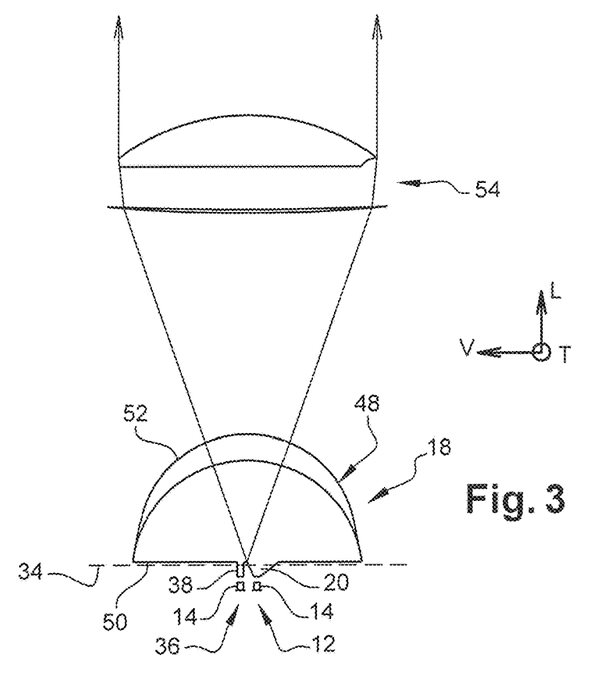
FIG. 3 is a side view which represents the light module of FIG. 1.
Figure 4:
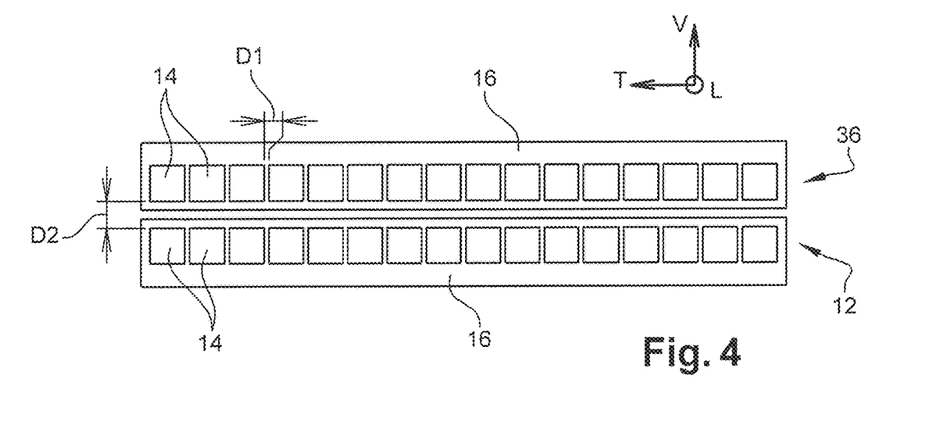
FIG. 4 is a front view which represents the light sources associated with the light module of FIG. 1.

The light module 10 comprises at least one first transverse row 12 of light sources 14 which are visible in particular in FIGS. 2, 3 and 4.

The light sources 14 can be switched on independently of one another, selectively, to obtain the desired lighting.

Each light source 14 is formed here by a light-emitting diode which has a light emission surface in quadrilateral form, here of square form. The emission surface extends in a substantially transverse vertical plane. Each light-emitting diode 14 emits light rays in a very open light cone. Each light-emitting diode 14 here emits the light along a substantially longitudinal emission axis.

Each light source 14 is borne by a printed circuit board 16. Advantageously, several adjacent light sources 14 of the row 12 are borne by a common printed circuit board 16 to form a strip of light sources 14.

The light module 10 also comprises at least one first one-piece primary optical element 18. The term "one-piece" here means that no part of the primary optical element 18 can be separated from the rest of the primary optical element 18.

Here, the primary optical element 18 is produced in a single piece in a transparent material, for example in polymethyl methacrylate.

The first primary optical element 18 comprises at least one first light forming layer 20 through which the light emitted by the light-emitting diodes 14 of the first row 12 enters into the first primary optical element 18.

A forming layer 20 is defined as an optical piece capable of guiding light by total internal reflection of this light, for example from an input face to an output face. A forming layer 20 has a small vertical thickness compared to its transverse width.

Thus, the forming layer 20 has an upper guiding face 22 and a lower guiding face 24 that are extensive and separated by a perimeter. This perimeter defines a thickness of the forming layer 20, which can be variable, for example decreasing from one end to the other. The perimeter comprises a transverse vertical rear light input face 26 common to all the light sources 14 of the first row 12. The rear input face 26 is arranged in proximity to the associated light sources 14, for example at a distance of between 0.1 and 1 millimetre.

The light emitted by the light sources 14 which enters through the rear face 26 is propagated inside the forming layer 20 by total internal reflection against the upper and/or lower faces 22, 24 towards a front output face 28 of the first forming layer. The front face 28 forms a portion of the perimeter of the forming layer 20.

The front output face 28 extends globally in a transverse vertical plane. This front face 28 can be planar or can be curved.

In the embodiment represented in the figures, the output face 28 of the first forming layer 20 has a height greater than that of its input face 26. Because of this, the first forming layer 20 has, in transverse longitudinal cross section, a divergent profile from its input face 26 to its output face 28.

The input face 26 has a height which is equal to or slightly greater than the height of the emission surface of the associated light sources 14, for example between one and three times the height of the emission surface.

The light module 10 comprises at least one bifocal imaging device 30 which is designed to project an image of each light source 14. The imaging device 30 has a first, transverse focusing plane 32 which is arranged substantially coinciding with the light sources 14, in proximity to the input face 26 of the first forming layer 20, and a second, vertical focusing plane 34 which is arranged substantially coinciding with the output face of the first forming layer 20.

Thus, for each light source 14 arranged substantially in proximity to the first, transverse focusing plane 32, the light rays emitted by the emission surface of said light source 14 are projected onto the road so as to form a light segment delimited transversely by vertical edges which are the sharp image of the vertical edges of the emission surface.

Similarly, each light source 14 creates, on the output face 28 of the forming layer 20, a secondary light source. Each secondary light source is thus delimited vertically by two transverse edges which coincide with the ridges formed by the upper and lower faces 22, 24 with the output face 28.

Since the output face 28 is arranged substantially in the second, vertical focusing plane 34, the light rays emitted by each secondary light source are projected to form a light segment delimited vertically by vertical edges which are the sharp image of the transverse edges of the secondary light source.

According to the teachings of the invention, the light module 10 comprises at least one second transverse row 36 of light sources 14 which is offset vertically relative to the first row 12. The second row 36 is, here, arranged above the first row 12.

The light sources 14 of the second row 36 are, here, similar to those of the first row 36. Here, they are light-emitting diodes. Each light source 14 of the second row 36 is, here, more particularly identical to the light sources 14 of the first row 12.

As is represented in FIG. 4, the light sources 14 of the second row 36 are also arranged relative to one another identically to those of the first row 12. Each light source 14 of the second row 36 is aligned vertically with a corresponding light source 14 of the first row 12.

The first primary optical element 18 comprises at least one second one-piece forming layer 38 which is associated with said second row 36. To this end, the second forming layer 38 is, here, arranged vertically above the first forming layer 20.

The second forming layer 38 also comprises a transverse vertical rear light input face 40 common to all the light sources 14 of the second row 36, an upper face 42 and a lower face 44 for guiding the light by total internal reflection towards a transverse vertical front light output face 46 of the first forming layer.

The output face 46 of the second forming layer 38 has a height slightly greater than that of its input face 40. Because of this, the second forming layer 38 has, in transverse longitudinal cross section, a divergent profile from its input face 40 to its output face 48.

The output face 46 of the second forming layer 38 has, here, a height less than that of the first forming layer 20.

The input face 40 has a height which is substantially equal to the height of the emission surface of the associated light sources 14.

The input face 40 of the second forming layer 38 is arranged in the same transverse vertical plane as the input face 26 of the first forming layer 20. Because of this, the input face 40 of the second forming layer 38 is arranged substantially in proximity to the first, transverse focusing plane 32 of the imaging device 30.

Similarly, the output face 46 of the second forming layer 38 is arranged in the same plane as the output face 28 of the first forming layer 20. Because of this, the output face 46 of the second forming layer 38 is arranged substantially coinciding with the second, vertical focusing plane 34 of the imaging device 30.

The output face 46 of the second forming layer 38 is substantially contiguous with the output face 28 of the first forming layer 20, apart from the thickness of the plate which makes it possible to separate each forming layer 20, 38 in the injection mould. More specifically, the lower transverse edge of the output face 46 of the second forming layer 38 coincides substantially with the upper transverse edge of the output face 28 of the first forming layer 20. This is made possible by the divergent profile in vertical longitudinal cross section of at least one of the forming layers 20, 38. Here, both the forming layers 20, 38 have a divergent profile.

Thus, the light segments created by the light sources 14 of the second row 36 are projected by the imaging device 30 in the same way as the light segments created by the light sources 14 of the first row 20.

In a variant of the invention that is not represented, the light module comprises at least one third transverse row of light sources offset vertically relative to the other rows. The primary optical element then comprises at least one third transverse forming layer associated with the third row of light sources. The input faces of the third forming layer are respectively in the same transverse vertical plane as the input and output faces of the first forming layer. Because of this, the input face of the third forming layer is arranged substantially in proximity to the first, transverse focusing plane 32 of the imaging device, and the output face of the third forming layer is arranged substantially coinciding with the second, vertical focusing plane 34 of the imaging device.

In the embodiment represented in the figures, the primary optical element 18 comprises a correction front part 48 in which each forming layer 20, 38 emerges directly through its output face 28, 46. The correction part 48 has, more particularly, a rear face 50 through which enter the light rays leaving the forming layers 20, 38. The rear face 50 is, here, a transverse vertical planar face.

The correction part 48 is produced in a transparent material having the same refractive index as the forming layers 20, 38. More particularly, the correction part 48 is, here, produced in the same material as the forming layers 20, 38. The correction part 48 and the forming layers 20, 38 are, here, produced of a piece in a single part. The output face 28, 46 of the forming layers 20, 38 coincides with the rear face 50 of the correction part 48.

The correction part 48 also has a front output face 52 through which the light rays emitted by each light source 14 leave the primary optical element 18.

The imaging device 30 is, here, formed by the combination of the form of the output face 52 of the primary optical element 18 and by a secondary optical element 54 which is arranged longitudinally in front of and at a distance from the output face 52 of the primary optical element 18. The secondary optical element 54 is, here, formed by a single projection lens.

In a variant of the invention that is not represented, the secondary optical element is formed by an objective having several lenses.

According to another variant of the invention that is not represented, the secondary optical element is formed by a reflector.

According to yet another variant of the invention that is not represented, the output face of the primary optical element has a convergent form (bi-spherical or quasi bi-spherical) so as to correct the field curvature of the imaging device independently in the horizontal direction, on the one hand, and in the vertical direction, on the other hand.

Figure 5:
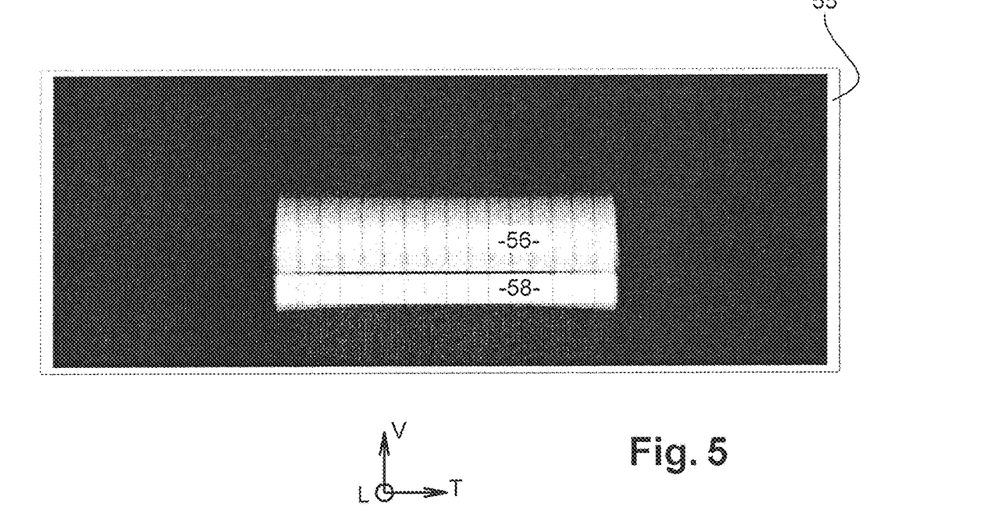
FIG. 5 is a front view which represents a screen lit by a segmented light beam produced by the light module of FIG. 1.
Figure 6:
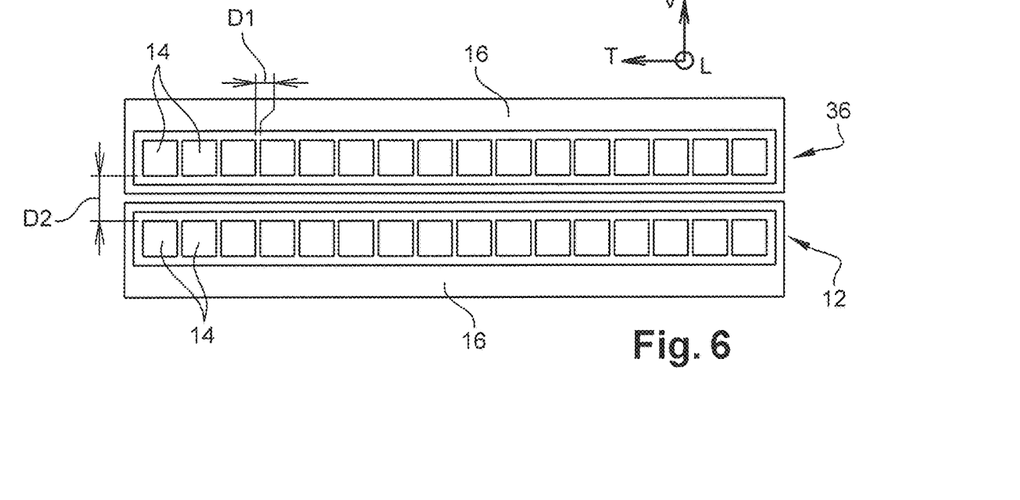
FIG. 6 is a view similar to that of FIG. 4 which represents light sources associated with a light module produced according to a second embodiment of the invention.
Figure 7:
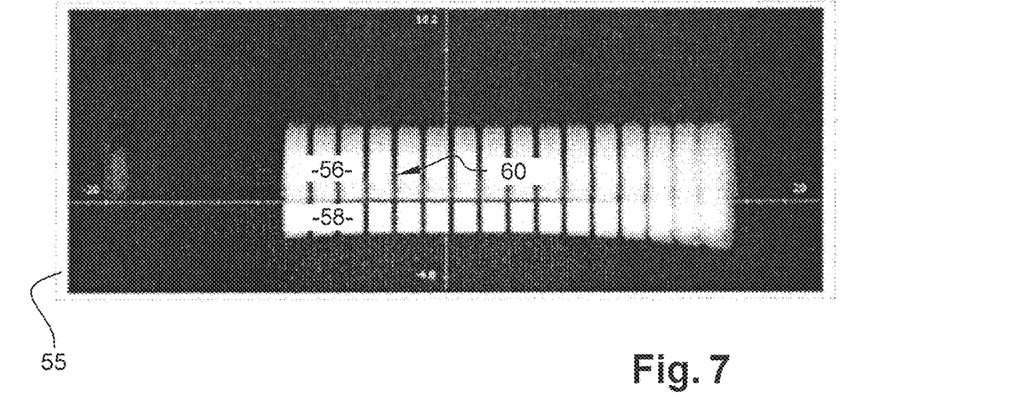
FIG. 7 is a view similar to that of FIG. 5 which represents the light segments which would light the screen if the light sources of FIG. 6 were used with the light module produced according to the first embodiment of the invention.

According to a first embodiment of the invention which is represented in FIGS. 1 and 5, each row 12, 36 of light sources 14 comprises at least one group of light sources in which two adjacent light sources 14 are separated transversely by a first determined distance "D1", the first determined distance "D1" being less than or equal to 10% of the transverse width of the light emission surface of each of the light sources 14, as is represented in FIG. 4.

In a nonlimiting manner, this is in particular when the light-emitting diodes 14 are formed on one and the same substrate. This type of mounting is called "monolithic light-emitting diode matrix".

In this embodiment, the first, transverse focusing plane 32 of the imaging device is arranged substantially on the plane of the emission faces of the light sources 14 of the two rows 20, 36.

FIG. 5 shows a screen 55 arranged in front at approximately 25 m from the vehicle equipped with the light module 10 lit by the segmented light beam emitted by the light module 10 when all the light sources 14 are switched on simultaneously. An upper row of light segments 56 is created by projection of each light source 14 of the first row 12 and a lower row of light segments 58 is created by projection of each light source 14 of the second row 36. It will be noted in this regard that the image device 30 vertically inverts the image of the first and second rows 12, 36. The image of the first and second rows 12, 36 is thus inverted relative to a median vertical longitudinal plane.

When a light source 14 of one or other of the rows 12, 36 is switched off selectively, the corresponding light segment gives way to a dark zone.

In this embodiment, each light segment 56, 58 is delimited transversely by two sharp vertical edges which are directly the images of the vertical edges of the emission surfaces of each emission surface. Similarly, each light segment is delimited vertically by two transverse edges which are the images of the transverse edges of the output face 28, 46 of each forming layer 20, 38. This is due to the particular arrangement of the two focusing planes 32, 34 of the imaging device 30.

As can be seen in FIG. 5, given that the determined distance "D1" between two light sources of each row 12, 6 is very small, two adjacent light segments 56, 58 of each row are substantially contiguous, or at the very least separated by a transverse space that is sufficiently small not to disturb the driver of the vehicle.

Moreover, referring to FIG. 4, it can be seen that the emission surfaces of the light sources 14 of the first row 12 are arranged at a determined vertical distance "D2" from the emission surfaces of the light sources 14 of the second row 36. This vertical distance "D2" is very much greater than the first distance "D1", for example greater than 50% of the height of an emission surface. If the lower and upper transverse edges of each emission surface were imaged directly by the imaging device 30, the light segments 56 of the first row would be separated vertically from the light segments 58 of the second row by a distance that is too great to allow a comfortable lighting of the road.

However, the second, vertical focusing plane 34 being arranged coinciding with the output faces 28, 46 of the two forming layers 20, 38, and said output faces 28, 46 being substantially contiguous, the light segments 56 of the first row are substantially contiguous with the light segments 58 of the second row, or at the very least separated by a vertical space that is sufficiently small not to disturb the driver of the vehicle. Moreover, given that the emission surfaces of each light source 14 have a square form, the arrangement according to the invention naturally gives the light segments a vertically stretched rectangular form.

According to a second embodiment of the invention which is represented in FIGS. 6 to 10, each row 12, 36 of light source comprises at least one group of light sources 14 in which two adjacent light sources 14 are separated by a first determined transverse distance "D1", the determined distance "D1" being greater than 10% of the transverse width of the light emission surface of each of the light sources 14. The distance "D1" is for example greater than the transverse width of the emission surface of each of the light sources 14.

This is in particular the case when the light sources 14 are light-emitting diodes which are borne by individual substrates. If the imaging device were to directly image the emission surface of the light sources 14, as in the first embodiment, light segments 56, 58 would be obtained transversely separated from one another by non-lit bands 60 that are too wide to provide a comfortable lighting for the driver, as is for example illustrated in FIG. 7.

To overcome this problem, the second embodiment of the invention proposes that the imaging device comprise means for widening the size of the image of each light source 14 so that the light segments 56, 58 forming images of two adjacent light sources 14 of one and the same row 12, 36 are contiguous, even superposed so as to obtain an even more uniform lighting.

Figure 8:
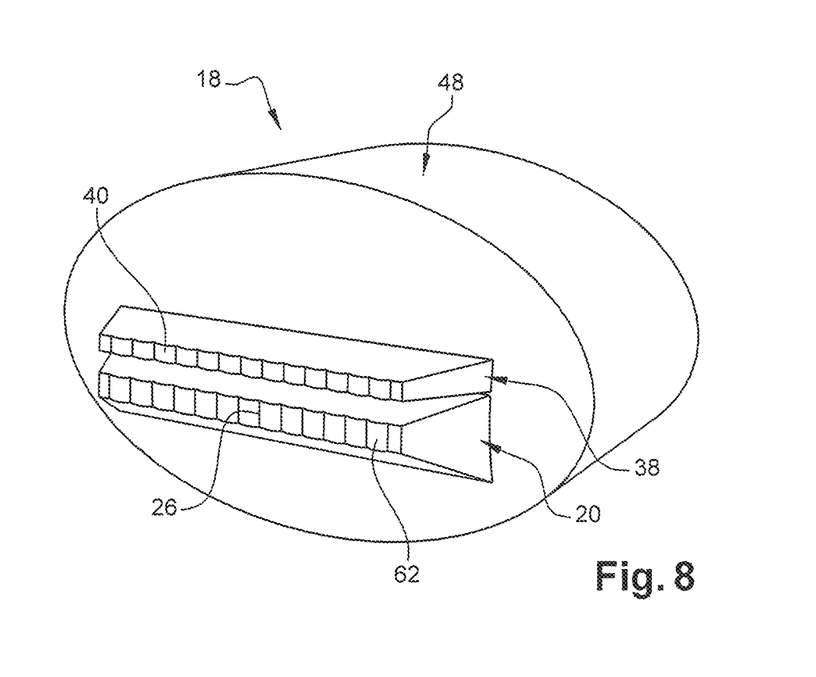
FIG. 8 is a perspective view of a primary optical element of a light module produced according to the second embodiment of the invention.

As is represented in FIG. 8, the input face 26, 40 of each forming layer 20, 38 associated with said row 12, 36 of separated light sources 14 comprises means for transversely widening the size of the image of each light source 14 so that the images of two adjacent light sources 14 of one and the same row 12, 36 are contiguous. The input faces 26, 40 here have relief patterns 62, that is to say patterns protruding or hollowed out, of cylindrical form of vertical axis forming pads. Each light source 14 is associated with a pattern 62.

The patterns 62 are, here, designed to spread the light rays transversely without deflecting them vertically.

The first, transverse focusing plane 32 is, here, arranged coinciding with the light sources 14.

As a variant, the first, transverse focusing plane 32 is, here, arranged coinciding with the input faces 26, 40 of the forming layers 20, 38.

Figure 10:
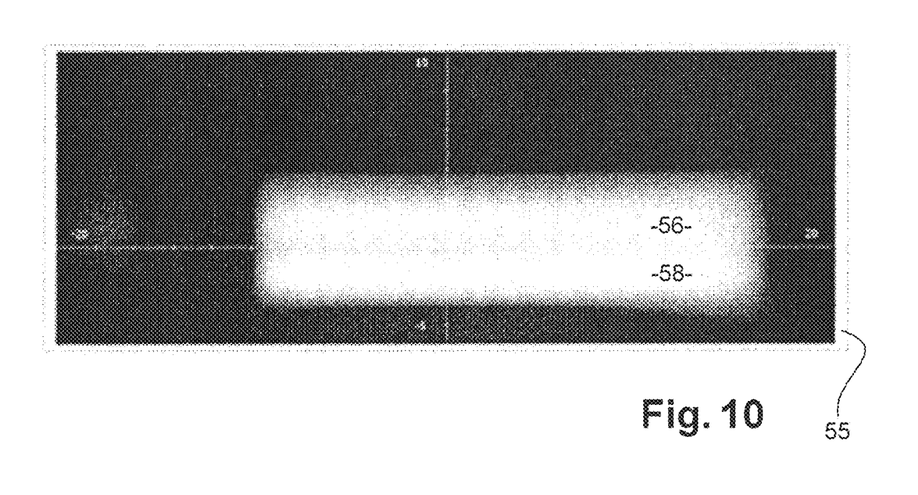
FIG. 10 is a view similar to that of FIG. 5 which represents the screen lit by a segmented light beam emitted by a light module produced according to the second embodiment of the invention.

The arrangement of these patterns 62 makes it possible to transversely widen the light segments 56, 58 for them to be contiguous, as is illustrated in FIG. 10.

According to a variant embodiment of this second embodiment that is not represented, the patterns 62 are arranged on an output face of the secondary optical element 54. The effect obtained is substantially the same as that represented in FIG. 10.

Figure 9:
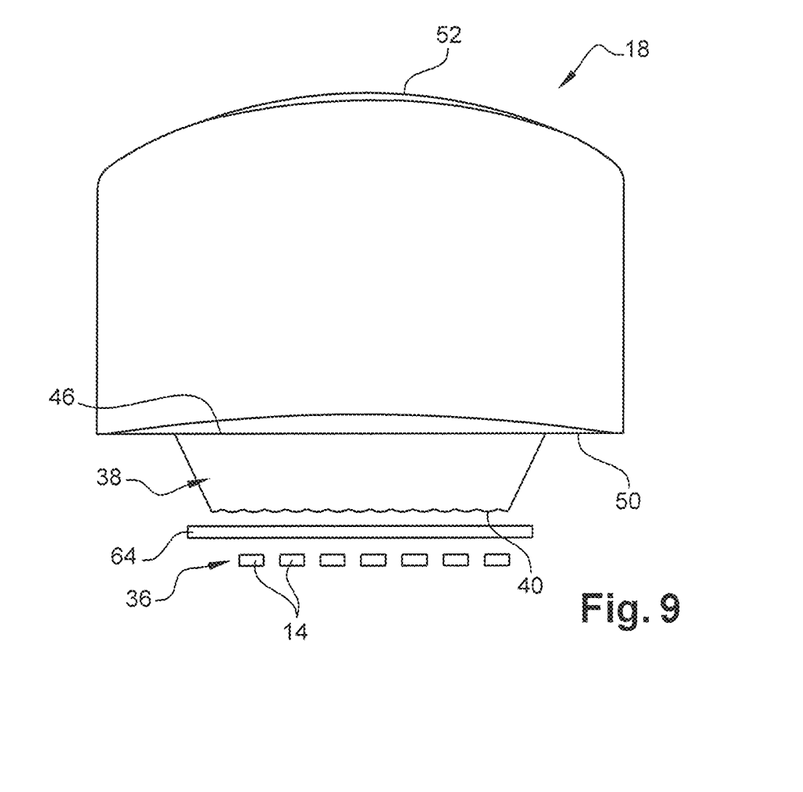
FIG. 9 is a plan view which represents a variant embodiment of the light module produced according to the second embodiment of the invention.

According to another variant of this second embodiment which is represented in FIG. 9, a convergent lens is interposed between each light source 14 and the input face 26, 40 of the forming layer 20, 38 associated with said light source 14. In the example represented in FIG. 9, all the convergent lenses are produced in a single matrix 64 of mini-lenses. This matrix of mini-lenses 64 extends in a transverse vertical plane and it makes it possible to accurately orient the light rays emitted by each light source 14 towards the pattern 62 which is associated with it on the input face 26, 40 of the forming layer 20, 38. This makes it possible to make the lighting uniform in the plane of the patterns, and therefore to produce a beam which provides a more uniform lighting while conserving a good discrimination of the light segments. In fact, the mini-lenses make it possible to guarantee that the light rays emitted by a determined light source light only the patterns which are associated with it by avoiding having said light source light neighbouring patterns which are not associated with it. Advantageously, each mini-lens has dimensions corresponding to 1 to 5 times the dimensions of the light-emission surface of the light source 14. In particular, the dimensions of each mini-lens can be millimetric.

The first two embodiments make it possible to obtain a light beam in which the light segments are contiguous. However, it has been found that the suppliers of light sources often offer components in the form of strips comprising only a limited number of light sources. When a row is to be produced that has a larger number of light sources 14, it is necessary to align several strips of light sources on the same line. However, the light sources at the end of two adjacent strips are separated by a transverse distance greater than the transverse distance between two light sources of the same strip. The result thereof is that the light segments 56, 58 created by two different strips are grouped together transversely into two groups which are separated by a central dark band. This dark band does not allow a comfortable lighting of the road.

The invention proposes solving this problem by virtue of a third embodiment represented in FIGS. 11 to 15. In this third embodiment, the light module 10 comprises two primary optical elements 18A, 18B which are each produced according to either one of the first and second embodiments.

Figure 11:
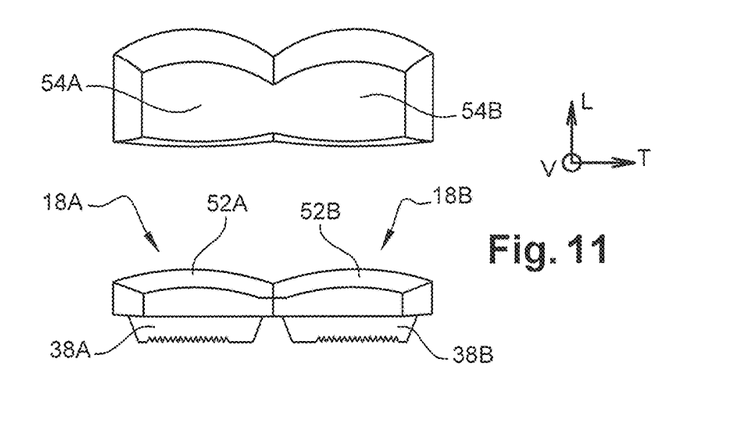
FIG. 11 is a plan view of a light module produced according to a third embodiment of the invention and comprising two primary optical elements.

The two primary optical elements 18A, 18B are, here, arranged transversely side-by-side. They are here produced of a piece in a single common part.

Each primary optical element 18A, 18B thus comprises a first forming layer 20A, 20B associated with a first row 12A, 12B of light sources 14. Similarly, each primary optical element 18A, 18B comprises a second forming layer 20A, 20B associated with a second row 36A, 36B of light sources 14. The second primary optical element 18B has the same characteristics as the first primary optical module 18A.

Each primary optical element 18A, 18B is associated with an imaging device 30A, 30B which conforms to the imaging device 30 described in the first and second embodiments. More particularly, in the example represented in FIG. 11, each imaging device 30A, 30B is formed by the combination of the output face 52A, 52B of the associated primary optical element 18A, 18B and of a secondary optical element 54A, 54B.

The secondary optical elements 54A, 54B are, here, formed by two lenses arranged transversely side-by-side. They are, here, produced of a piece in a single common part.

Figure 12:
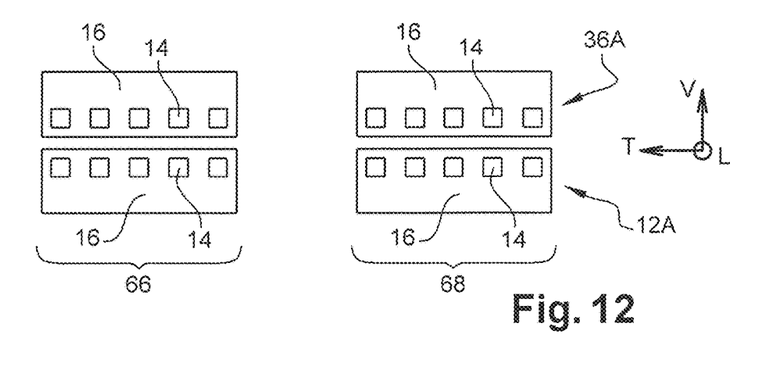
FIG. 12 is a front view which represents the light sources associated with the first primary optical element of the light module of FIG. 11.

Referring to FIG. 12, the first row 12A and the second row 36A of light sources 14 which are associated with the first primary optical element 18A have been represented. Each row 12A, 36A has the same characteristics as the rows 12, 36 of light sources 14 of the two first embodiments, except for the fact that each row 12A, 36A is split at least into two groups 66, 68 of light sources 14, each group 66 being separated transversely from an adjacent group 68 by a determined transverse distance "D3" greater than the transverse width of an emission surface of one of the light sources 14.

The light sources 14 belonging to the same group 66, 68 of one and the same row 12A, 36A are, here, borne by one and the same printed circuit board 16 to form an independent strip. In the example represented in FIG. 12, the first primary optical element 18A is thus associated with four strips distributed in two rows.

Figure 13:
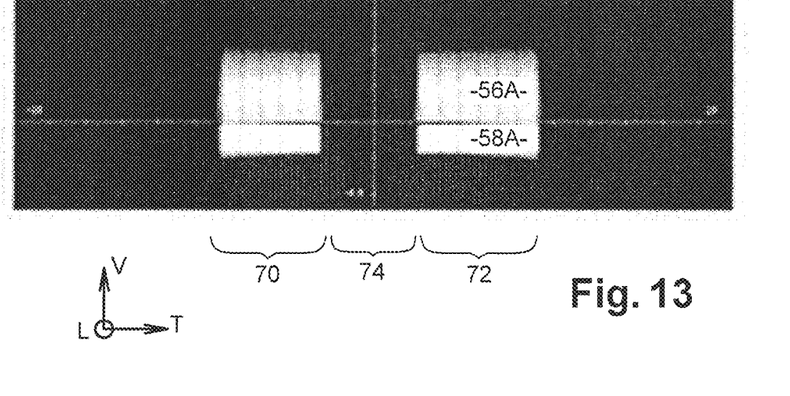
FIG. 13 is a front view similar to that of FIG. 5 which represents the screen lit only by the first primary optical element of the light module of FIG. 11.
Figure 14:
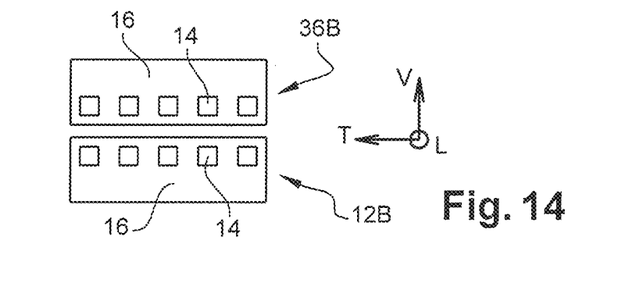
FIG. 14 is a front view which represents the light sources associated with the second primary optical element of the light module of FIG. 11.

Thus, each group 66, 68 creates an associated group 70, 72 of light segments. The groups of light segments 70, 72 forming the image of two adjacent groups 66, 68 of light sources 14 by the imaging device 30A are thus spaced apart by a dark interval 74 of determined transverse width.

The width of the dark interval 74 is determined by the separation between the two groups 66, 68 of light sources. In the example represented in FIG. 12, two strips 16 of one and the same row are separated transversely to obtain the desired width.

Figure 15:
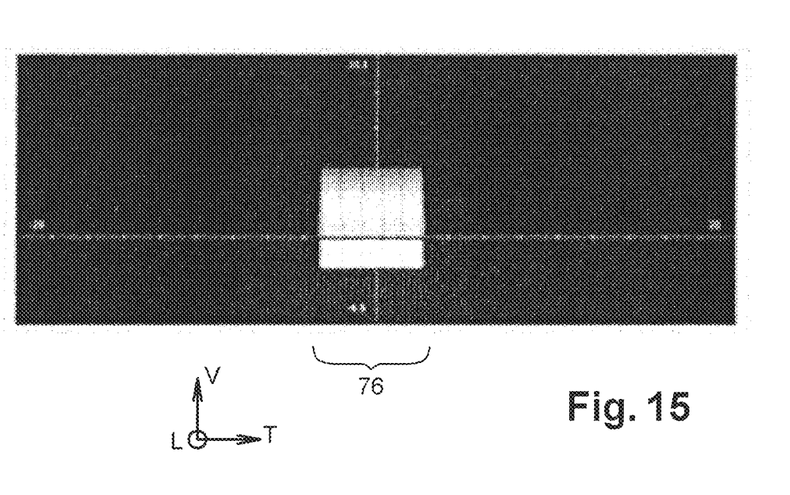
FIG. 15 is a front view similar to that of FIG. 5 which represents the screen lit only by the second primary optical element of the light module of FIG. 11.

The second primary optical element 18B is associated with at least two rows 12B, 36B of light sources 14, here, the same number of rows as the first primary optical element 18A. In each of said rows 12B, 36B, the light sources are, here, aligned in a single group. The second bifocal imaging device 30B associated with the second primary optical element 18B makes it possible to project the image of the associated light sources 14 to form a group 76 of light segments 56B, 58B, as is illustrated in FIG. 15.

The group 76 of light segments is projected by the second imaging device 30B in the dark interval 74 reserved between the two groups 70, 72 of light segments 56A, 58A projected by the first imaging device 30A. Thus, the group 76 projected by the second imaging device 30B has substantially the same transverse width as the dark interval 74. When all the light sources 14 of the two primary optical elements 18A, 18B are switched on simultaneously, a lighting is thus obtained which is similar to that which is represented in FIG. 5 in which all the light segments 56A, 56B and 58A, 58B are substantially contiguous.

The light module produced according to any one of the embodiments of the invention thus makes it possible to obtain a light beam with segments which are contiguous without overlapping or else with partial overlap to obtain a more uniform lighting. This makes it possible to selectively switch off each segment to create a shadow zone while comfortably lighting the road.

The invention claimed is:

1. Light module of a motor vehicle comprising:
    at least one first transverse row of light sources;
    at least one first one-piece primary optical element which has at least one first forming layer which comprises a transverse rear light input face for the light that is common to all the light sources of the first row, an upper face and/or a lower face for guiding the light by total internal reflection towards a transverse front output face;
    at least one bifocal imaging device which is designed to project an image of each light source, the imaging device having a first, transverse focusing plane which is arranged substantially coinciding with the light sources and a second, vertical focusing plane which is arranged substantially coinciding with the output face of the first forming layer;
    wherein the light module comprises at least one second transverse row of light sources which is offset vertically relative to the first row, the first primary optical element comprising at least one second one-piece forming layer which is associated with said second row and which comprises a transverse rear input face for the light, common to all the light sources of the second row, and arranged in the first, transverse focusing plane, an upper face and/or a lower face for guiding the light by total internal reflection towards a transverse front output face which is arranged in the second, vertical focusing plane.

2. Light module according to claim 1, wherein the output face of the first forming layer and the output face of the second forming layer are contiguous by one of their transverse edges.

3. Light module according to claim 2, wherein the light module comprises at least three rows of light sources, the primary optical element comprising at least three transverse forming layers each associated with a row of light sources.

4. Light module according to claim 2, wherein each row of light sources comprises at least one group of light sources in which two adjacent light sources are separated by a determined distance, the determined distance being less than 10% of the transverse width of the light emission surface of one of the light sources.

5. Light module according to claim 2, wherein each row of light sources comprises at least one group of light sources in which two adjacent light sources are separated by a determined distance, the determined distance being greater than 10% of the transverse width of the light emission surface of one of the light sources, notably greater than the transverse width of the emission surface of one of the light sources.

6. Light module according to claim 2, wherein in each row of light sources associated with the first optical element is split at least into two groups of light sources, each group being transversely separated from an adjacent group by a determined distance greater than the transverse width of an emission surface of one of the light sources so that the groups of images of two adjacent groups of light sources produced by the first imaging device are spaced apart by a determined dark interval.

7. Light module according to claim 1, wherein each row of light sources comprises at least one group of light sources in which two adjacent light sources are separated by a determined distance, the determined distance being greater than 10% of the transverse width of the light emission surface of one of the light sources, notably greater than the transverse width of the emission surface of one of the light sources.

8. Light module according to claim 7, wherein the input face of the forming layer associated with said row of separated light sources comprises relief patterns for transversely widening the size of the image of each light source so that the images of two adjacent light sources of one and the same group of one and the same row are contiguous.

9. Light module according to claim 8, wherein a convergent lens is interposed between each light source and the input face of the associated forming layer.

10. Light module according to claim 7, wherein the imaging device comprises means for transversely widening the size of each light source so that the images of two adjacent light sources of one and the same group of one and the same row are contiguous.

11. Light module according to claim 10, wherein the imaging device comprises a secondary optical element which comprises a light passage surface comprising patterns deflecting the light rays to transversely and/or vertically widen the size of the image of each light source.

12. Light module according to claim 7, wherein the imaging device comprises a secondary optical element which comprises a light passage surface comprising patterns deflecting the light rays to transversely and/or vertically widen the size of the image of each light source.

13. Light module according to claim 1, wherein the light module comprises at least three rows of light sources, the primary optical element comprising at least three transverse forming layers each associated with a row of light sources.

14. Light module according to claim 1, wherein in each imaging device is formed by the combination of the form of a light output face of the primary optical element and by an associated projection lens.

15. Light module according to claim 1, wherein in each row of light sources associated with the first optical element is split at least into two groups of light sources, each group being transversely separated from an adjacent group by a determined distance greater than the transverse width of an emission surface of one of the light sources so that the groups of images of two adjacent groups of light sources produced by the first imaging device are spaced apart by a determined dark interval.

16. Light module according to claim 15, wherein the light module comprises a second primary optical element having the same characteristics as the first primary optical module, the second primary optical element being associated with at least two rows of light sources in which the light sources are aligned in at least one group, a second bifocal imaging device being associated with the second primary optical element to project a group of images of the associated light sources in the dark interval reserved between two groups of images projected by the first imaging device.

17. Light module according to claim 16, wherein the first primary optical element and the second primary optical element are produced in a single piece.

18. Light module according to claim 16, wherein each imaging device comprises at least one secondary optical element, the secondary optical elements of each of the imaging devices being produced in a single common piece.

19. Light module according to claim 15, wherein each imaging device comprises at least one secondary optical element, the secondary optical elements of each of the imaging devices being produced in a single common piece.

20. Light module according to claim 1, wherein each row of light sources comprises at least one group of light sources in which two adjacent light sources are separated by a determined distance, the determined distance being less than 10% of the transverse width of the light emission surface of one of the light sources.

* * * * *